United States Patent [19]

Crapanzano

[11] Patent Number: 4,516,707

[45] Date of Patent: May 14, 1985

[54] FISHING PLUG AND LURE ORGANIZER

[76] Inventor: Joseph R. Crapanzano, 602 Shore Ave., Ship Bottom, N.J. 08008

[21] Appl. No.: 583,444

[22] Filed: Feb. 24, 1984

[51] Int. Cl.³ ............................................. A01K 97/06
[52] U.S. Cl. .................................... 224/202; 43/57.1; 206/315.11; 224/920
[58] Field of Search ............... 224/920; 43/54.1, 57.1; 206/315.11, 45.14, 45.24

[56] References Cited

U.S. PATENT DOCUMENTS

| | | | |
|---|---|---|---|
| 1,261,861 | 4/1918 | Sherman | 206/315.11 X |
| 1,591,297 | 7/1926 | Dumouchel | 43/57.1 |
| 1,840,439 | 1/1932 | Ewell | 206/45.24 X |
| 2,444,369 | 6/1948 | Rentos | 206/45.24 X |
| 2,474,752 | 6/1949 | Montgomery | 224/920 X |
| 2,678,182 | 5/1954 | Young | 206/45.24 X |
| 3,168,192 | 2/1965 | Nicholson et al. | 206/45.24 |
| 3,680,750 | 8/1972 | Franco | 224/920 X |
| 3,739,518 | 6/1973 | Ziegler | 220/20 X |
| 3,769,741 | 11/1973 | Hessler et al. | 43/57.1 |
| 4,281,470 | 8/1981 | Anderson | 224/920 X |

Primary Examiner—Stephen Marcus
Assistant Examiner—Robert Petrik
Attorney, Agent, or Firm—William V. Pesce

[57] ABSTRACT

A portable container for supporting and displaying fishing plugs and lures in a well organized manner consisting of a housing having a partially removed section for viewing, a telescopic cover for said housing split into two sections hinged together along a single intermediate edge which telescopally slides into the housing, the upper section having a transparent window and is capable of being folded over when the cover at the hinged part reaches the upper extremity of the housing. The bottom section slides back down over the housing while the upper section resides without the housing to form an angular support for the housing. There are securing members at the lower extremities of both the housing and telescopic cover to secure their parts while in transit.

A removable holder is carried by the housing which includes spaced apart mounting slots at both extremes for receiving and tensioning the plugs and lures to secure them to assure that they are not dislodged in transit, and to display them in an organized array for selection purposes.

3 Claims, 8 Drawing Figures

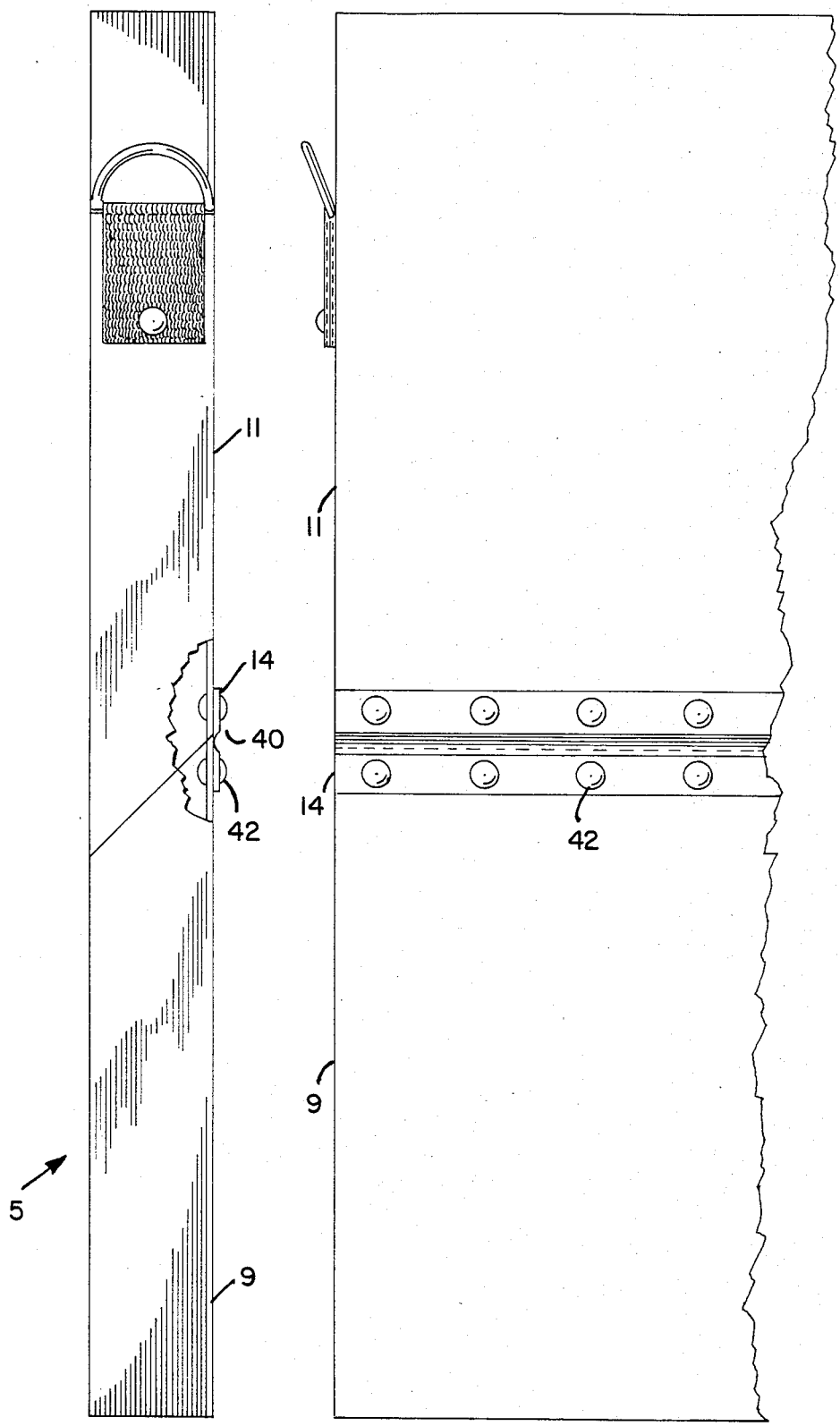

FISHING PLUG AND LURE ORGANIZER

BACKGROUND OF THE INVENTION

This invention refers to a container for housing fishing plugs and lure devices in a convenient accessable place and in particular to a container for maintaining fishing plug and lure devices in an orderly organized manner so as to provide easy and simple access thereto.

In the fishing game, be it for sport or business, the fishing plugs and lures carried by the fisherman are generally in a bag, box or container and generally the lines forming a part of the lure and plug become entangled, sometimes to the extent that much time and patience is lost in dis-entangling the lines. Sometimes the lines even get broken. Further the fishing boxes and bags do not allow for leaders which vary in length, a must when many different types of lures and plugs are used.

During the remainder of the description, when referring to lures it will be understood that plugs, where possible, are also indicated. A plug is a type of lure that floats whereas another form of lure is one that is solid and is for the purpose of adding weight to the fishing line.

SUMMARY OF THE INVENTION

The invention as contemplated herein is for the purpose of providing a novel container which enables the placement of the various lures on a support in said container in an orderly and organized manner so that there can be no entanglement of lines or hooks and provides immediate and ready access to a particular lure when desired. In the device or invention herein contemplated there is provided a container having a slidable cover which slides over a housing, of the same configuration, upwardly along the housing during the opening process and thereafter folds backward and forms an easel-like support for the container. With the cover removed, the contents of the container are viewable and accessable. There is mounted within said container a holder having spaced-apart slots or grooves at upper and lower extremities of the holder for the purpose of receiving and containing the individual lures and leaders connected therebetween in an orderly array. The holder is removable from the container to permit the user to simply make a selection of the lure desired and thereafter the holder merely placed back into the container.

Accordingly a principal object of the invention is to provide a fishing line and plug organizer which avoids the entanglement of lines, hooks and lures in such transport units such as fishing boxes, bags and the like.

Another object of the invention is to provide a transport container for fishing lures and plugs which permits the proper organization and orientation of lure and plugs in an orderly array within the container and is weather-proof.

Still another object of the invention is to provide an accessable container which is self-supporting and provides visual means to observe the lures attached to a support carried by and within said container.

And still another object of the invention is to provide a convenient source of fishing lines and plugs which are readily accessable and selectable and saves time and avoids confusion during the selection process.

Another object of the invention is to provide a lure and plug holder which can accommodate leaders of varying lengths in a selectable array without any entanglement or rupture of such variable length leaders.

Other objects and advantages of this invention will become apparant when reading the following specifications and studying the accompanying drawings.

FIG. 7 shows a partial elevational view of the back side of the organizer.

FIG. 8 shows a frontend view of FIG. 7 showing the hinged part partially sectioned.

DESCRIPTION OF THE INVENTION

Figure 1:
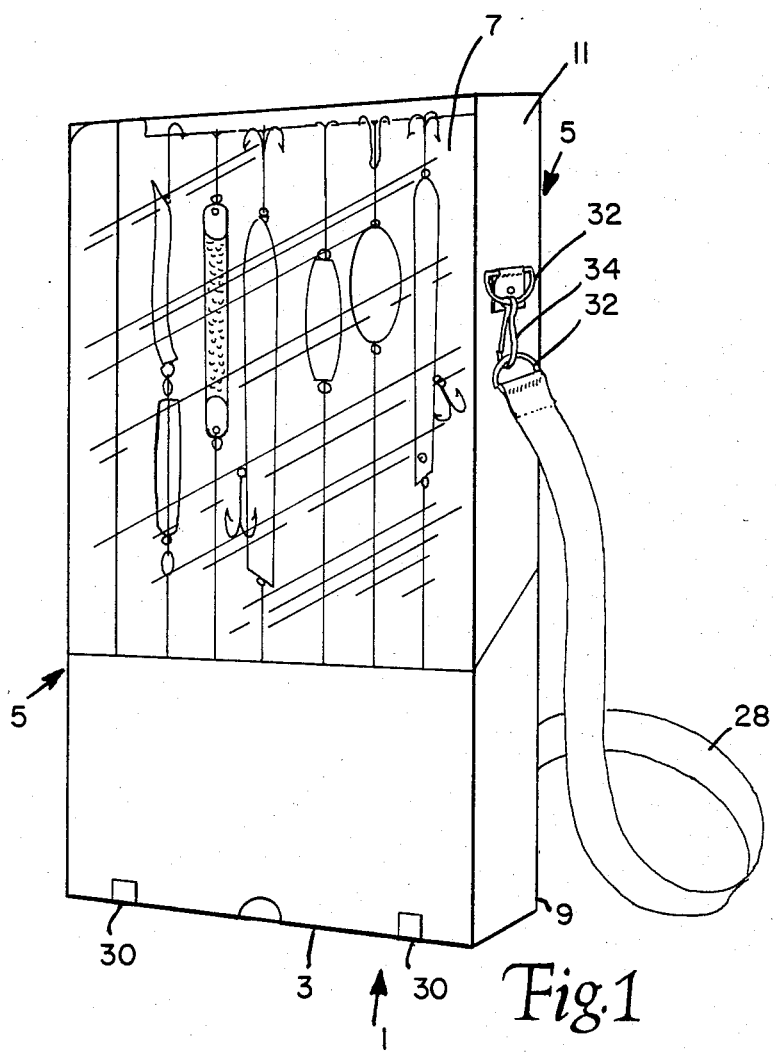
FIG. 1 is a perspective view of the fishing lure and plug organizer container completely closed and ready for transport or placement for opening purposes.

Now referring to the specific drawings identifying like parts with the same reference number, thereis shown in FIG. 1 a container comprised of a housing 3 and a similarly shaped slidable left cover 5 including a transparent window 7 for the purpose of viewing the contents of the container 1.

Figure 2:
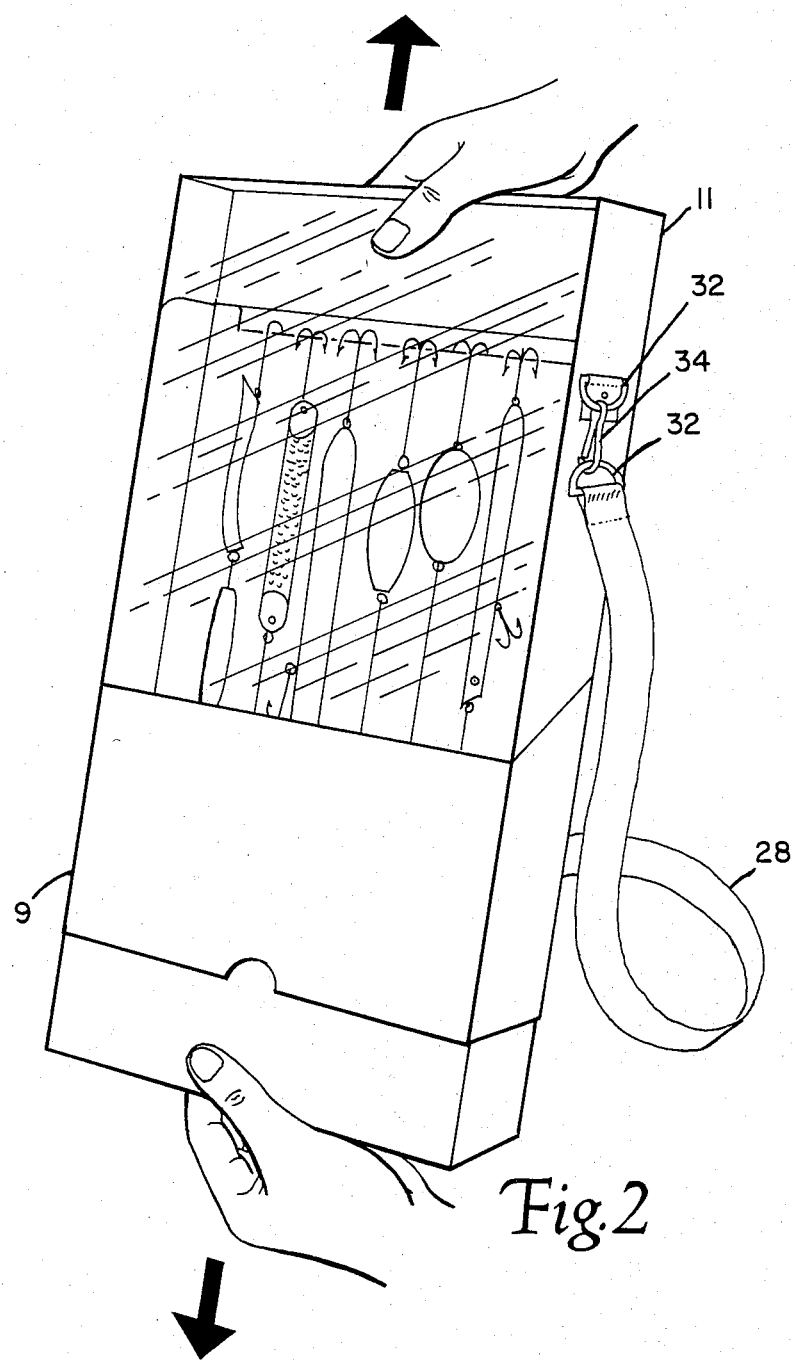
FIG. 2 is a perspective view of the container of FIG. 1 in the process of being opened by the user and is shown partially opened.
Figure 3:
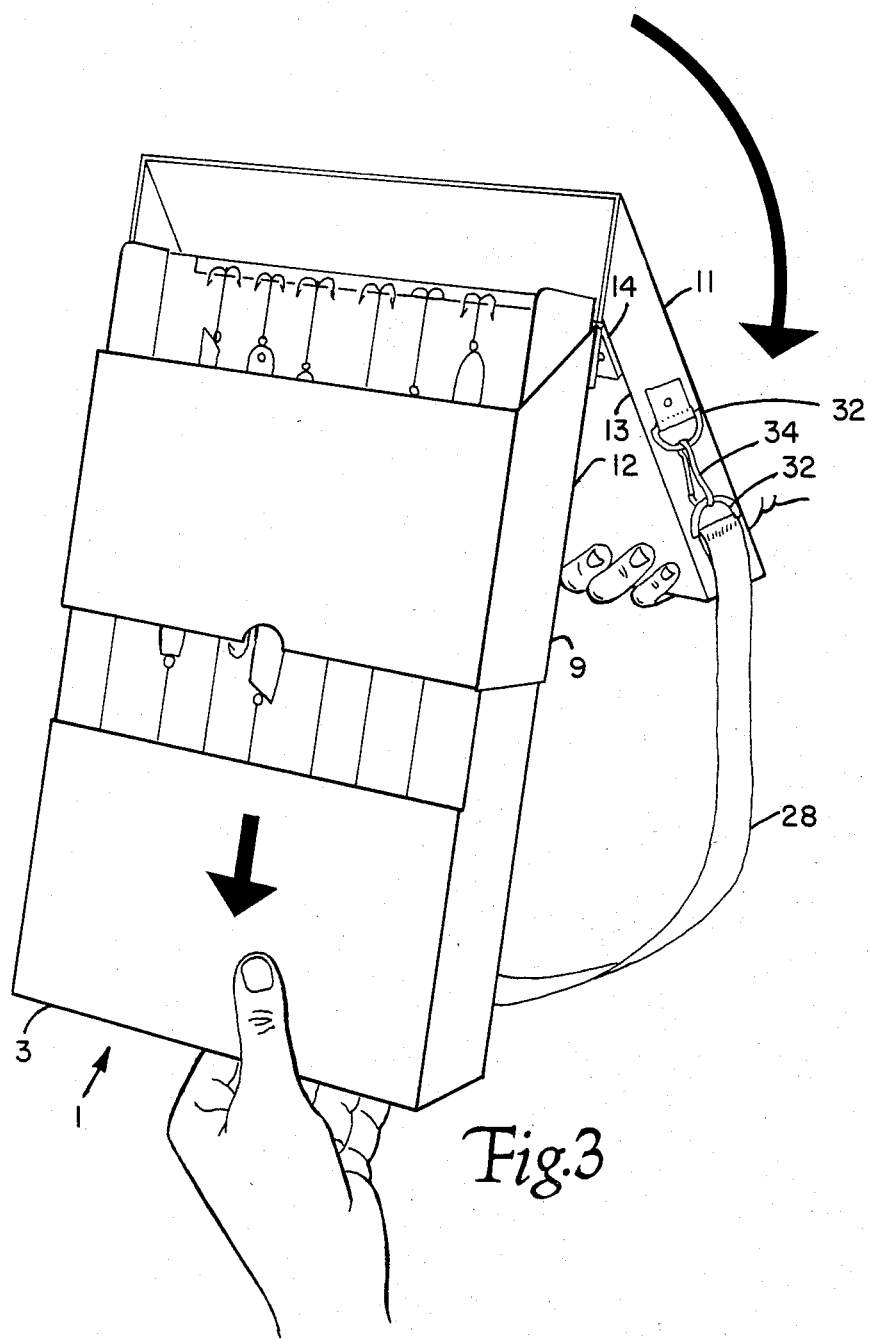
FIG. 3 is a perspective view of the container being still further opened by the user to the point where the hinge attaching the upper and lower portions of the cover reaches the upper-part of the container housing and clears same so that the upper cover section may be folded back to form an easel support.

FIGS. 2 and 3 show different stages of the cover 5 as it is being slidably removed from the container housing 3 in order to expose the contents of the container. The cover 5 essentially comprises two section 9,11 hinged together along back surfaces 12, 13 intermediate the outer edges of said cover by a hinge 14. The cover 5 essentially is box-like in shape and slides over and covers similarly shaped housing 3.

Figure 4:
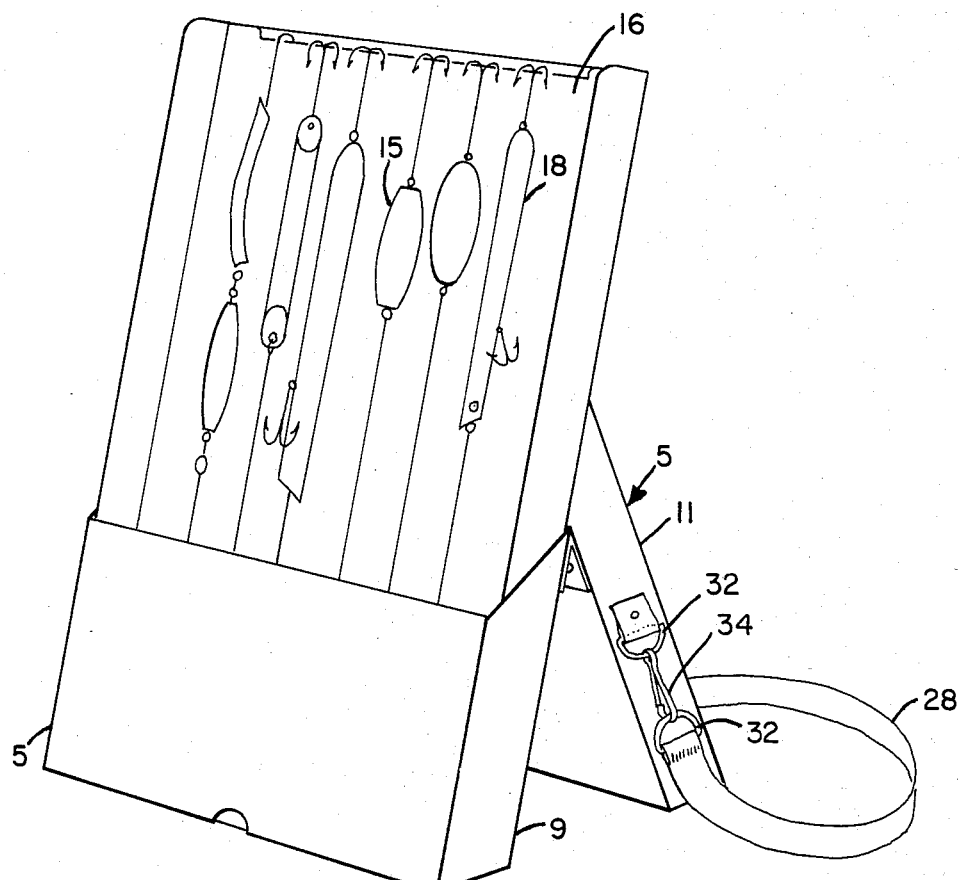
FIG. 4 is a perspective view of the container fully opened with the upper cover section fully folded backwards to form an easel support and the lower cover section sliding to the bottom of the container housing to maintain the container's housing in an upright position.

The cover 5 has an upper section 11 and a lower section 9 each hinged by hinge 14 so that both behave comparably to the opening and closing of a hook when the hinge 14 reaches the upper portion of the housing 3. In FIG. 4, the cover section 9 is thereafter moved downwardly so as to remain with and cover the lower housing portion while still supporting same. The upper part of the housing remains exposed since the lower portion usually covering this part of the housing is now completely folded back and forms a support for the whole container.

Figure 5:
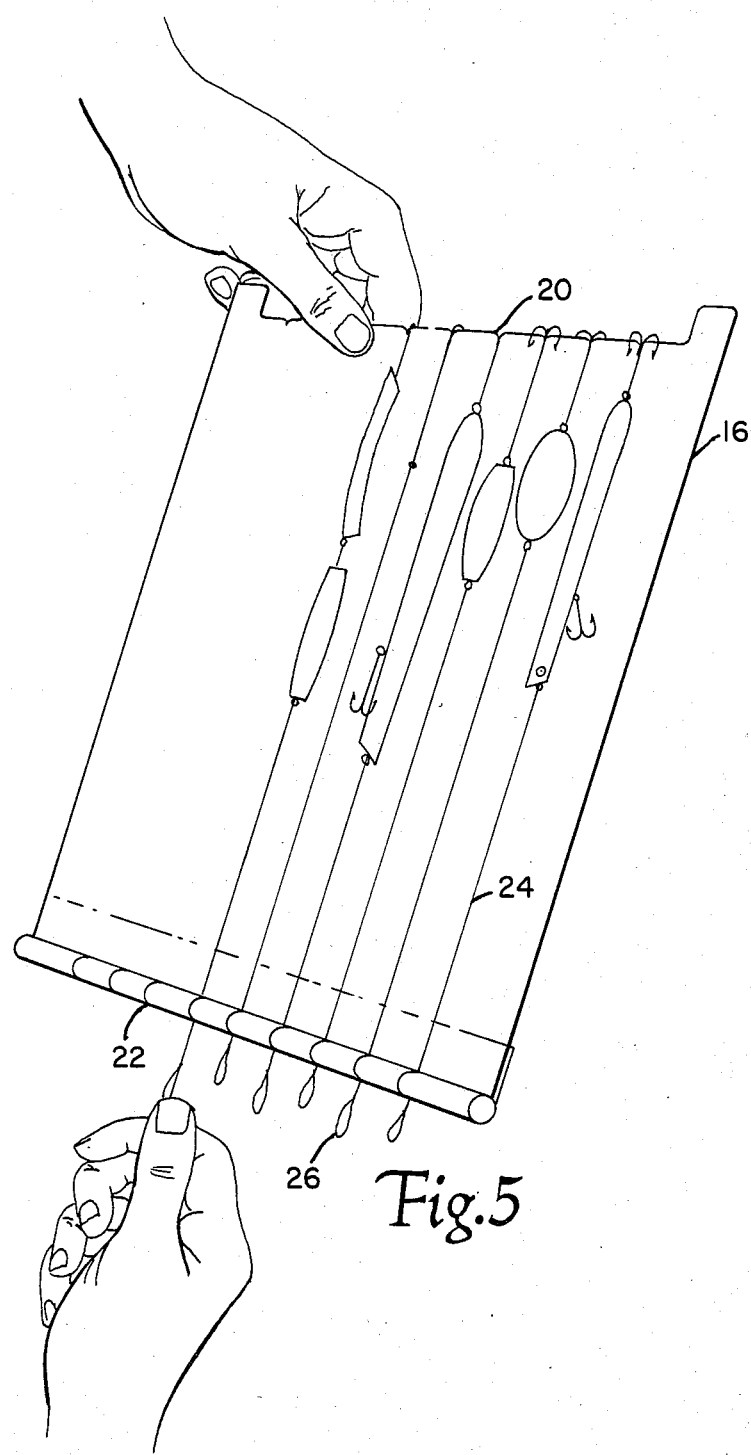
FIG. 5 is a perspective view of the lure holder and the manner of attachment and removal of the individual lures having varying leader lengths.

The exposed portion of the container, as shown in FIG. 4, reveals a holder planer member 16 residing within the container and has placed thereon in an orderly array a series of different type lures 18 each representing different fishing needs and purposes. The lures are individually placed upon the holder member as shown in FIG. 5 Each of the lures is bridged between two holder slots or notches 20,22 at the upper and lower extremes of the holder. In particular, the hook part of the lure is placed in the upper notch 20 and the leader part of the lure placed in the lower notch 22. The leader portion 24 of the lure is made taut by the stretching thereof, and the end thereof placed throught the notch 24 at the lower part of the holder. The lower end of the leader is terminated in a closed loop 26 which is used for connections to the fishing line when is use.

The cover 5 has attached thereto a shoulder strap for purposes of convenience in carrying the container. Also there are snaps 30 for securing the cover to the housing to avoid the possibility of the container coming apart. The shoulder strap 28 has each of its extremities sewed to an eyelet 32. A similar eyelet is attached to the cover and both eyelets secured by a self-locking hook 34. The above manner for transporting the container is only for demonstration purposes. Other transport means may be devised herein without detracting from the true purpose and intent of the invention herein.

Figure 6:
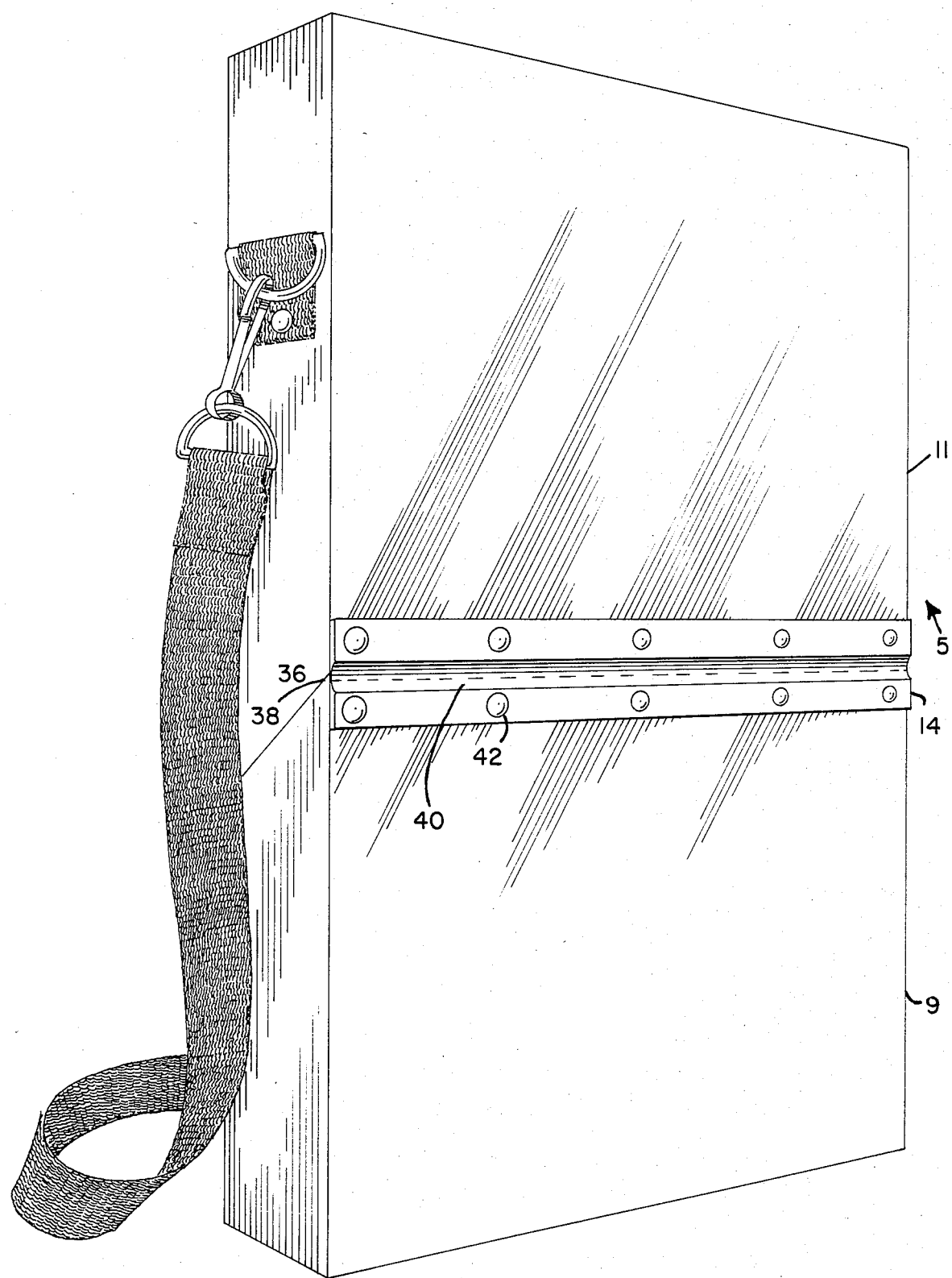
FIG. 6 shows in perspective the back view of the assembled lure and plug organizer.

In FIG. 6 there is shown in perspective the back portion of the organizer, and in particular the cover 5 and the two sections 7,11 forming a part thereof connected together by hinge 14, the hinge completely traversing the edges 36,38 of respective cover sections. The hinge 14 is a continuous malleable plastic-like member disposed to fold at the midsection 40, and is secured to the respective sections 9,11 by securing means 42 such as screws, rivets and the like. FIGS. 7 and 8 are additional views of the organizer to more particularly show the section and hinge arrangement.

In operation the container is transported to the desirable site and the cover thereafter lifted until the hinged portion of the cover is free of the housing at its upper extremity. The cover is then folded back on its hinge so that the lower part of the cover is free to slide back over the housing to its original position before the cover was opened. The upper portion of the cover is then made to rest upon the support surface to render support for the housing.

Thereafter the lure holder is removed from the housing and the lure desired removed therefrom. Hence no fuss or complication or other entanglement usually encounted with lures not otherwise conveyed.

What has been shown is a specific embodiment of the invention which defines the invention herein, but that it is understood that other embodiments are possible and that other changes and modifications may be accomplished without detracting from the true intent and purposes of the invention herein.

Having defined the invention what is claimed is:

1. A fishing plug and lure organizer in the form of a portable container for supporting and displaying fishing plugs and lures arranged in an orderly manner for ease of transport and selection comprising,
  (a) a housing unit,
  (b) cover means for said unit telescopically slidable thereover and being composed of distinct upper and lower sections hinged along a single common edge and surface intermediate their extremities, the upper section being disposed to reside outside the housing to form a support therefore, and the lower section simultaneously residing over and covering the lower portion of said housing to allow viewing the contents of said housing,
  (c) transparent means in said cover in the upper section thereof disposed to permit viewing the contents of said container including fishing plugs and lures located therein when both cover sections telescopically enclose the housing,
  (d) a removable holder carried by said housing including mounting means thereon and forming a part thereof disposed to individually maintain said plugs and lures in an orderly array and display for the selection thereof, and
  (e) securing means carried by said housing and cover during the transport thereof.

2. A fishing plug and lure organizer as per claim 1 and wherein said cover means includes means for carry and support by the cover.

3. A fishing plug and lure organizer as per claim 1 and wherein said holder mounting means includes spaced apart slots at the upper and lower extremities disposed to retain individual plugs and lures in an orderly array including the tensioning thereof to assure said plugs and lures are secured within the slots to avoid displacement during the transport of the organizer.

* * * * *